United States Patent
Krallis et al.

(10) Patent No.: US 12,018,102 B2
(45) Date of Patent: Jun. 25, 2024

(54) PROCESS FOR POLYMERIZING OLEFIN IN A GAS PHASE REACTOR WITH IMPROVED THERMAL HOMOGENEITY

(71) Applicant: BOREALIS AG, Vienna (AT)

(72) Inventors: Apostolos Krallis, Porvoo (FI); Vasileios Kanellopoulos, Linz (AT); Erno Elovainio, Porvoo (FI); Klaus Nyfors, Porvoo (FI)

(73) Assignee: Borealis AG, Vienna (AT)

( * ) Notice: Subject to any disclaimer, the term of this patent is extended or adjusted under 35 U.S.C. 154(b) by 739 days.

(21) Appl. No.: 17/051,204

(22) PCT Filed: May 29, 2019

(86) PCT No.: PCT/EP2019/064035
§ 371 (c)(1),
(2) Date: Oct. 28, 2020

(87) PCT Pub. No.: WO2019/238428
PCT Pub. Date: Dec. 19, 2019

(65) Prior Publication Data
US 2021/0130508 A1 May 6, 2021

(30) Foreign Application Priority Data
Jun. 14, 2018 (EP) .................................... 18177750

(51) Int. Cl.
*C08F 2/34* (2006.01)
*B01J 8/00* (2006.01)
(Continued)

(52) U.S. Cl.
CPC .............. *C08F 2/34* (2013.01); *B01J 8/0055* (2013.01); *B01J 8/08* (2013.01); *B01J 8/1827* (2013.01);
(Continued)

(58) Field of Classification Search
CPC combination set(s) only.
See application file for complete search history.

(56) References Cited

U.S. PATENT DOCUMENTS 3,324,093 A 6/1967 Alleman
3,405,109 A 10/1968 Rohlfing
(Continued)

FOREIGN PATENT DOCUMENTS

EP      45976 A2    2/1982
EP      45977 A2    2/1982
(Continued)

OTHER PUBLICATIONS

Office Action issued for Application No. CN201980033578.8 with English Translation dated May 27, 2023, 20 pages.
(Continued)

*Primary Examiner* — Nicole M. Buie-Hatcher
(74) *Attorney, Agent, or Firm* — Lowenstein Sandler LLP

(57) ABSTRACT

The present invention relates to a process for polymerizing at least one olefin in gas phase in a fluidized bed in a polymerization reactor having a top zone of a generally conical shape as such that the equivalent cross-sectional diameter is monotonically decreasing with respect to the flow direction of the fluidization gas, a middle zone in direct contact with and below said top zone of a generally cylindrical shape and a bottom zone in direct contact and below said middle zone and of a generally conical shape as such that the equivalent cross-sectional diameter is monotonically increasing with respect to the flow direction of the fluidization gas, comprising the steps of: a) introducing a first stream of fluidization gas into the bottom zone; b) polymerizing at least one olefin in the presence of a polymerization catalyst in the fluidized bed formed by particles of a polymer of the at least one olefin suspended in an upwards flowing stream of the fluidization gas in the middle zone; c) with-
(Continued)

drawing a second stream comprising the fluidization gas and optionally particles of a polymer of the at least one olefin from the top zone; characterized in that the temperature of the particles of the polymer of the at least one olefin in the fluidized bed ($T_{PP}$) does not exceed 120% of the operating temperature set point ($T_S$) of the polymerization reactor, wherein $T_{PP}$ and $T_S$ are both given in °C., and the use of said process for polymerizing an olefin homo- or copolymer having a narrow particle size distribution.

14 Claims, 2 Drawing Sheets

(51) Int. Cl.
| | | |
|---|---|---|
| *B01J 8/08* | (2006.01) | |
| *B01J 8/18* | (2006.01) | |
| *B01J 8/24* | (2006.01) | |
| *C08F 10/02* | (2006.01) | |
| *C08F 210/16* | (2006.01) | |

(52) U.S. Cl.
CPC .............. *B01J 8/1872* (2013.01); *B01J 8/24* (2013.01); *C08F 10/02* (2013.01); *C08F 210/16* (2013.01)

(56) References Cited

U.S. PATENT DOCUMENTS

| | | | |
|---|---|---|---|
| 4,107,414 A | 8/1978 | Giannini et al. | |
| 4,186,107 A | 1/1980 | Wagner | |
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Jeno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,582,816 A | 4/1986 | Miro | |
| 4,621,952 A | 11/1986 | Aronson | |
| 4,657,882 A | 4/1987 | Karayannis et al. | |
| 5,391,654 A | 2/1995 | Ahvenainen et al. | |
| 2001/0037004 A1* | 11/2001 | Durand | C08F 10/00 526/348.4 |
| 2014/0080991 A1* | 3/2014 | Eriksson | C08F 10/00 422/131 |
| 2015/0344595 A1* | 12/2015 | Castro | C08F 10/06 526/127 |

FOREIGN PATENT DOCUMENTS

| | | | |
|---|---|---|---|
| EP | 47077 A1 | 3/1982 | |
| EP | 188125 A2 | 7/1986 | |
| EP | 250169 A2 | 12/1987 | |
| EP | 372239 A2 | 6/1990 | |
| EP | 479186 A2 | 4/1992 | |
| EP | 579426 A1 | 1/1994 | |
| EP | 683176 A1 | 11/1995 | |
| EP | 688794 A1 | 12/1995 | |
| EP | 810235 A2 | 12/1997 | |
| EP | 887380 A1 | 12/1998 | |
| EP | 1415999 A1 | 5/2004 | |
| EP | 1538167 A1 | 6/2005 | |
| EP | 1600276 A1 | 11/2005 | |
| EP | 1739103 A1 | 1/2007 | |
| EP | 1752462 A1 | 2/2007 | |
| EP | 1860125 A1 | 11/2007 | |
| EP | 2330135 A1 | 6/2011 | |
| EP | 2495037 A1 | 9/2012 | |
| EP | 2495038 A1 | 9/2012 | |
| EP | 2594433 A1 | 5/2013 | |
| EP | 2890490 A1 | 7/2015 | |
| EP | 2913345 A1 | 9/2015 | |
| EP | 2913346 A1 | 9/2015 | |
| EP | 3103818 A1 | 12/2016 | |
| GB | 1272778 A | 5/1972 | |
| GB | 1580635 A | 12/1980 | |
| WO | 9212182 A1 | 7/1992 | |
| WO | 9512622 A1 | 5/1995 | |
| WO | 9532994 A1 | 12/1995 | |
| WO | 9618662 A1 | 6/1996 | |
| WO | 9632423 A1 | 10/1996 | |
| WO | 9728170 A1 | 8/1997 | |
| WO | 9832776 A1 | 7/1998 | |
| WO | 9858976 A1 | 12/1998 | |
| WO | 9858977 A1 | 12/1998 | |
| WO | 9951646 A1 | 10/1999 | |
| WO | 9961489 A1 | 12/1999 | |
| WO | 0029452 A1 | 5/2000 | |
| WO | WO-0029452 A1 * | 5/2000 | ............. B01J 8/003 |
| WO | 0061278 A1 | 10/2000 | |
| WO | 0155230 A1 | 8/2001 | |
| WO | 0166610 A1 | 9/2001 | |
| WO | 02088194 A1 | 11/2002 | |
| WO | 03010208 A1 | 2/2003 | |
| WO | 03051514 A1 | 6/2003 | |
| WO | 03051934 A2 | 6/2003 | |
| WO | 2003106510 | 12/2003 | |
| WO | 2003106510 A1 | 12/2003 | |
| WO | 2004085499 A2 | 10/2004 | |
| WO | 2005118655 A1 | 12/2005 | |
| WO | WO-2007071527 A1 * | 6/2007 | ............ B01J 8/1827 |
| WO | 2012116844 A1 | 9/2012 | |
| WO | 2017108586 A1 | 6/2017 | |
| WO | 2017108945 A1 | 6/2017 | |
| WO | 2018/34176 A1 | 12/2018 | |
| WO | 201823999 A1 | 12/2018 | |

OTHER PUBLICATIONS

Yang Shushan, "Practical Handbook of Petroleum and Petrochemical Technology", Nov. 30, 2003, pp. 175-176, China Petrochemical Press, 1st Edition, 20 pages.
Kanellopoulos et al. "Gas-Phase Olefin Polymerization in the Presence of Supported and Self-Supported Ziegler-Natta Catalysts", (2008), Macromolecular Reaction Engineering 2(3), pp. 240-252.
Kanellopoulos et al. "Comprehensive Analysis of Single-Particle Growth in Heterogeneous Olefin Polymerization: The Random-Pore Polymeric Flow Model", (2004), Industrial & Engineering Chemistry Research 43(17), pp. 5166-5180.
Kirk-Othmer, "Gas Cleaning", Encyclopedia of Chemical Technology, 2nd edition (1966), vol. 10, pp. 340-342.
International Search Report for PCT/EP2019/064035 dated Oct. 2, 2019, 17 pages.
Pinch, Richard, "Monotone Function", Encyclopedia of Mathematics, Nov. 15, 2014, 2 pages, https://encyclopediaofmath.org/index.php?title=monotone_function&oldid=34526.
Horiba Scientific; "A Guidebook to Particle Size Analysis", Horiba Instruments, Inc., Sep. 2019, 34 pages, https://static.horiba.com/fileadmin/Horiba/Products/Scientific/Particle_Characterization/Particle_Guidebook_09-2019.pdf.

* cited by examiner

PROCESS FOR POLYMERIZING OLEFIN IN A GAS PHASE REACTOR WITH IMPROVED THERMAL HOMOGENEITY

CROSS-REFERENCE TO RELATED APPLICATION(S)

This application is a national phase of International Application No. PCT/EP2019/064035, filed on May 29, 2019, which claims the benefit of European Patent Application No. 18177750.9, filed on Jun. 14, 2018. The contents of these applications are hereby incorporated by reference in their entirety.

FIELD OF THE INVENTION

The present invention relates to a process for polymerizing olefin in a fluidized bed reactor of specific shape and the use of said process for polymerizing olefin homo- or copolymers with a narrow particle size distribution.

BACKGROUND OF THE INVENTION

Conventional fluidized bed reactors, i.e. bubbling gas phase olefin polymerization reactors are known in the art. They typically operate under moderate superficial gas velocity values, especially for polyethylene production, in order to secure that sufficient gas-solids mixing efficiency is achieved and the solids carryover/entrainment phenomena is limited. Typical superficial gas velocity values used, typically for polyethylene are 0.35-0.5 m/s and for polypropylene 0.40-0.70 m/s. However, depending on the polymer grade to be produced, a number of operability issues could be encountered with relating to quality of the fluidization, solids segregation and bed homogeneity and temperature variations between polymer particles.

Reactor operating conditions (i.e. temperature, pressure, chemical composition) in combination with the particle morphological characteristics and particle size distribution (PSD) determine the product molecular microstructure and end use applications and the reactor operability. For a given PSD, the temperature variation between the polymer particles in a fluidized bed reactor, as a result of limitations in heat transfer from the polymer particles to the reaction medium (gas phase) can cause polymer product inhomogeneity. Increasing the heat transfer rates from the polymer particles to the gas phase, for a given PSD, can increase polymer product homogeneity.

Especially large size polymer particles (i.e. particles having a particle size of more than 1000 μm) have a tendency to form agglomerates due to insufficient heat removal, which quite often results in operational discrepancies. In particular large and active polymer particles entering a gas phase reactor have a high tendency to experience particle overheating leading to partly softening on their surface and to increased stickiness. Softening on the surface results in increased stickiness which in turn leads to formation of agglomerates.

Reactor assemblies and methods relating thereto with a so called "double cone reactor structure" have been presented for example in EP2495037, EP2495038, EP2913346, EP2913345, EP2890490, EP 3103818. However, none of these relate to a method, arrangement or use of the arrangement for enhancing heat transfer rate from polymer particles to a gas medium, i.e. fluidization gas.

SUMMARY OF THE INVENTION

The present invention relates to a process for polymerizing at least one olefin in gas phase in a fluidized bed in a polymerization reactor having a top zone of a generally conical shape as such that the equivalent cross-sectional diameter is monotonically decreasing with respect to the flow direction of the fluidization gas, a middle zone in direct contact with and below said top zone of a generally cylindrical shape and a bottom zone in direct contact and below said middle zone of a generally conical shape as such that the equivalent cross-sectional diameter is monotonically increasing with respect to the flow direction of the fluidization gas, comprising the steps of:

a) introducing a first stream of fluidization gas into the bottom zone;
b) polymerizing at least one olefin in the presence of a polymerization catalyst in the fluidized bed formed by particles of a polymer of the at least one olefin suspended in an upwards flowing stream of the fluidization gas in the middle zone;
c) withdrawing a second stream comprising the fluidization gas and optionally particles of a polymer of the at least one olefin from the top zone;

characterized in that the temperature of the particles of the polymer of the at least one olefin in the fluidized bed ($T_{PP}$) does not exceed 120% of the operating temperature set point ($T_S$) of the polymerization reactor, wherein $T_{PP}$ and $T_S$ are both given in ° C.

In a preferred embodiment the process according to the invention relates to a multi-stage polymerization process in which at least two polymerization stages are connected in series and the last polymerization stage is said process for polymerizing at least one olefin in gas phase in a fluidized bed as defined above or below.

Further, the present invention relates to the use of the process according to the present invention as described above or below for polymerizing an olefin homo- or copolymer having a narrow particle size distribution.

Still further, the present invention relates to the use of a multi-stage polymerization process in which at least two polymerization stages are connected in series and the last polymerization stage is said process for polymerizing at least one olefin in gas phase in a fluidized bed as defined above or below for obtaining a higher polymer production split in said last polymerization stage.

Definitions

A cone is a three-dimensional geometric shape that tapers smoothly from a flat base to a point called the apex or vertex. Conical shape in the present invention means the shape of a cone.

In mathematics a monotonic function is a function of one variable, defined on a subset of the real numbers, whose increment $\Delta f(x)=f(x')-f(x)$, for $\Delta x=x'-x>0$, does not change sign, that is, is either always negative or always positive. If $\Delta f(x) \geq 0$, then the function is called monotonically increasing; if $\Delta f(x) \leq 0$, then the function is called monotonically decreasing. (http://www.encyclopediaofmath.org/index.php?title=Monotone_function&oldid=34526)

In the present invention the equivalent cross-sectional diameter of the top zone of generally conical shape is monotonically decreasing with respect to the flow direction of the fluidization gas, if the equivalent cross-sectional diameter does not increase with respect to the flow direction of the fluidization gas, i.e. either decreases or is kept constant.

In the present invention the equivalent cross-sectional diameter of the top zone of generally conical shape is monotonically increasing with respect to the flow direction of the fluidization gas, if the equivalent cross-sectional diameter does not decrease with respect to the flow direction of the fluidization gas, i.e. either increases or is kept constant.

A cylinder is a three-dimensional geometrical solid which is made up of two parallel circular bases connected by a curved surface. Cylindrical shape in the present invention means the shape of a cylinder.

"In direct contact with" in the present invention means that two sections are not intersected by a third section of different shape.

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in m³/s) divided by the cross-sectional area of the middle zone (in m²) and the area occupied by the particles is thus neglected.

By fluidization gas is meant the gas comprising monomer, and eventual comonomers, chain transfer agent, diluents, such as propane, and inert components which form the upwards flowing gas in the gas-solids olefin polymerization reactor and in which the polymer particles are suspended, e.g. in the fluidized bed of a fluidized bed reactor. The unreacted gas is collected at the top of the reactor, compressed, cooled and returned to the bottom of the reactor. As it is understood by the person skilled in the art the composition of the fluidization gas is not constant during the cycle. Reactive components are consumed in the reactor and they are added into the circulation line for compensating losses.

The operating temperature set point ($T_S$) is the predetermined temperature given in ° C. at which the polymerization reaction is conducted in the fluidized bed reactor. Said predetermined temperature is set at the beginning of the polymerization reaction.

The particle size and particle size distribution is a measure for the size of the polymer particles polymerized in the gas phase reactor. The D-values (D10, D50 and D90) represent the intercepts for 10%, 50% and 90% of the cumulative mass of sample. The D-values can be thought of as the diameter of the sphere which divides the sample's mass into a specified percentage when the particles are arranged on an ascending mass basis. For example the D10 is the diameter at which 10% of the sample's mass is comprised of particles with a diameter less than this value. The D50 is the diameter of the particle that 50% of a sample's mass is smaller than and 50% of a sample's mass is larger than. The D90 is the diameter at which 90% of the sample's mass is comprised of particles with a diameter less than this value. The D50 value is also called median particle size. (https://www.horiba.com/fileadmin/uploads/Scientific/eMag/PSA/Guidebook/pdf/PSA_Guidebook.pdf,figure5). From laser diffraction measurements according to ISO 13320-1 the volumetric D-values are obtained, based on the volume distribution.

The distribution width or span of the particle size distribution is calculated from the D-values D10, D50 and D90 according to the below formula:

$$Span = \frac{D90 - D10}{D50}$$

The mean particle size is a calculated value similar to the concept of average. From laser diffraction measurements according to ISO 13320-1 the volume based mean particle size is obtained and calculated as follows:

$$\overline{D}_{pq}^{(p-q)} = \frac{\sum D_i^p}{\sum D_i^q}$$

wherein D=the average or mean particle size
(p−q)=the algebraic power of $D_{pq}$, whereby p>q
$D_i$=the diameter of the ith particle
Σ=the summation of $D_{ip}$ or $D_{iq}$ representing all particles in the sample Only in symmetric particle size distributions the mean particle size and the median particle size D50 have the same value.

Unless specifically otherwise defined, the percentage numbers used in the text refer to percentage by weight.

FIGURES

FIG. 1 shows a reactor assembly including a double-cone fluidized bed reactor suitable for the process of the present invention.

FIG. 2 shows a state of the art reactor assembly including a conventional fluidized bed reactor.

DETAILED DESCRIPTION

Process

The present invention is based on the idea that of employment of a special fluidized bed reactor structure, i.e. a so-called double cone reactor (DCR), in which the temperature of the polymer particles formed in the fluidized bed can be controlled within a temperature span of 120% of the reactor operating set point.

Said controlled temperature span allows an improved thermal homogeneity of the polymer particles and a more even particle growth. Consequently, a narrow particle size distribution of the polymer particles in the fluidized bed can be observed which results in an increased inherent homogeneity of the final polymer product which reduces the necessity of excessive post-polymerization processing steps for increasing the homogeneity of the final polymer product like e.g. harsh compounding conditions. In the opposite case where large size particles and agglomerates are present during the downstream processing, the high molecular weight hydrocarbons (i.e., propane, 1-butene and 1-hexene) cannot be sufficiently removed and a significant amount stays in the polymer particles, thus not meeting product properties requirements, especially for film applications where organoleptic properties are important.

A higher thermal homogeneity also reduces the formation of hot spots in the polymerization reactor and consequently reduces the formation of agglomerates. Further, a higher thermal homogeneity also reduces the risk for reactor shut down and for facing operability limitations and challenges.

The temperature distribution of the growing polymer particles of different particle sizes in the two reactor types are based on the particle size distribution (PSD), the physical and transport properties as well as the hydrodynamic conditions (such as superficial gas velocity values) as discussed below in the calculation method of temperature distribution of the polymer particles. The increased thermal homogeneity of the process of the present invention in the so-called double cone reactor (DCR) compared to the conventional fluidized bed reactors also results from much more enhanced morphological properties of the polymer powder collected from the reactor which provides a much lower amount of agglomerates and polymer particles with a narrow particle size distribution (PSD).

A further advantage of the present invention is that higher activity catalysts with increased comonomer incorporation can be handled in the process of the present invention using the so-called double cone reactor compared to conventional gas phase reactors.

A further advantage of the present invention is that in a multi-stage reactor process comprising a loop and a gas-phase reactor in series (i.e., Borstar process) a higher gas-phase reactor polymer production split compared to the loop reactor can be achieved in the present invention compared to conventional gas phase reactors. This is because in the current invention the double cone reactor design combined with the superior hydrodynamic conditions (increased superficial gas velocity) and enhanced gas-solids mixing conditions results in increased heat transfer rates from the growing polymer particles to the fluidisation gas. Thus, it is possible to operate the double cone reactor under increased monomer partial pressure, keeping the same monomer/comonomer molar ratio, compared to conventional gas phase reactor. This substantially increases the productivity of the double cone reactor compared to the productivity of the loop reactor, increasing thus the gas-phase reactor production split in a multi-stage reactor configuration process, e.g., loop reactors followed by gas phase reactor, series of gas phase reactors, etc. Higher split in the gas phase reactor has the advantage of producing multi-modal polymer grades with specific product quality specifications for advanced end-use applications in packaging, films, blow molding, etc. of. The present invention also enables operating the process at higher production throughput for the same multimodal polymer grade compared to a conventional fluidised bed reactor.

In the present invention, the hydrodynamic conditions which determine the gas-solid mixing efficiency are more enhanced due to the reactor design as well as to the higher superficial gas velocities that can be reached compared to the conventional gas phase reactor. In a gas-phase olefin polymerisation reactor the growing polymer particles exhibit internal and external mass and heat transfer limitations. At the surface of the growing polymer particles a gaseous boundary layer is formed which causes the external heat and mass transfer limitations. The particle to particle interactions are increased in the proposed reactor resulting in frequent renewable of the external boundary layer of the polymer particles which leads to significantly less external heat and mass transfer limitations around the growing polymer particles. This is extremely important since the tendency of particle overheating (i.e., the temperature difference between the particles and the gas phase) is substantially less, thus, less particle agglomeration phenomena. In conventional gas phase reactors it is not possible to increase the superficial gas velocity to a value which is compared to the one employed in the proposed reactor due to uncontrolled solids carry over (entrainment) which can lead to polymer build up in the surfaces of the disengagement zone (upper expansion part of the reactor) as well as to significant fouling of heat exchangers and compressor units.

The proposed gas phase reactor set up enables better control of the temperature of the polymer particles in the fluidized bed through manipulation of the superficial gas velocity, it exhibits enhanced mixing characteristics and it can handle polymer material of low densities (lower than 902 kg/m$^3$) due to enhanced powder flowability features. It also allows full control of particle flow throughout the reactor assembly and largely contributes in producing polymer particles with increased homogeneity (same material quality is produced in each zone of the reactor).

The partial pressure of the individual components that co-exist in the gas-phase reactor is calculated by multiplying the mole fraction of the individual gaseous components of the mixture with the overall reactor pressure.

The present invention relates to a process for polymerizing at least one olefin in gas phase in a fluidized bed in a polymerization reactor having a top zone of a generally conical shape as such that the equivalent cross-sectional diameter is monotonically decreasing with respect to the flow direction of the fluidization gas, a middle zone in direct contact with and below said top zone of a generally cylindrical shape and a bottom zone in direct contact and below said middle zone of a generally conical shape as such that the equivalent cross-sectional diameter is monotonically increasing with respect to the flow direction of the fluidization gas, comprising the steps of:
  a) introducing a first stream of fluidization gas into the bottom zone;
  b) polymerizing at least one olefin in the presence of a polymerization catalyst in the fluidized bed formed by particles of a polymer of the at least one olefin suspended in an upwards flowing stream of the fluidization gas in the middle zone;
  c) withdrawing a second stream comprising the fluidization gas and optionally particles of a polymer of the at least one olefin from the top zone;
  characterized in that
  the temperature of the particles of the polymer of the at least one olefin in the fluidized bed ($T_{PP}$) does not exceed 120% of the operating temperature set point ($T_S$) of the polymerization reactor, wherein $T_{PP}$ and $T_S$ are both given in ° C.

The temperature of the particles of the polymer of the at least one olefin in the fluidized bed ($T_{PP}$) is preferably calculated based on the physical and transport properties of the gaseous mixture as well as on the hydrodynamics of the reactor (mainly via the superficial gas velocity) as described below in the example section. Thereby, the $T_{PP}$ is given in ° C.

The "operating temperature set point" of the reactor or "the reactor operating temperature set point" is pre-determined and reflects the set point of a temperature controller controlling the temperature of the polymerization reactor. The reactor operating temperature set point depends on the recipe of the polymer grade to be produced. For example for polyethylene the reactor operating temperature set point is typically from 75 to 95° C., and for polypropylene from 75 to 90° C. A person skilled in the art is able to choose a suitable set point for the process of the present invention.

In conventional fluidised bed reactors there is a limitation of the heat transferred from the polymer particles to the gas medium. Depending on the operating conditions (e.g., superficial gas velocity, mixing intensity, comonomer partial pressure, polymer particle size, etc.) the heat transfer limitation can lead to particle overheating, softening and, thus, agglomeration. In order to avoid the particle overheating and agglomeration, there is an upper limit of the comonomer partial pressure, for a given catalyst system and a limit of the comonomer which is incorporated in the polymer.

Preferably, the temperature of the particles of the polymer of the at least one olefin in the fluidized bed ($T_{PP}$) does not exceed 117% of the operating temperature set point ($T_S$) of the polymerization reactor, more preferably does not exceed 115% of the operating temperature set point ($T_S$) of the polymerization reactor and most preferably does not exceed 113% of the operating temperature set point ($T_S$) of the polymerization reactor.

The process of the present invention preferably further comprises the steps of:
d) directing the second stream comprising the fluidization gas and optionally particles of the polymer of the at least one olefin into a separating unit comprising at least one cyclone;
e) withdrawing from the separating unit a third stream of fluidization gas depleted from particles of the polymer of the at least one olefin;
f) reintroducing said third stream of fluidization gas into the bottom zone of the polymerization reactor as first stream of fluidization gas; and
g) withdrawing from the separating unit a fourth stream enriched with particles of the polymer of the at least one olefin.

By means of process steps d) to g) polymer particles usually with a small particle size (so-called fines) which are entrained in the second stream are withdrawn from the circulation gas of the third stream.

The polymer particles in the second stream usually have a particle size D50 of less than 150 μm.

Said fourth stream comprising said fines can either be discarded or also been reintroduced into the polymerization reactor It is further preferred that the process of the invention further comprises the step of:
h) reintroducing the fourth stream enriched with particles of the polymer of the at least one olefin into the middle zone of the polymerization reactor.

By means of process step h) it can be ensured that entrained polymer particles can be re-introduced into the fluidized bed for further polymerization and particle growth. Said step also contributes to a narrower particle size distribution.

Further, the process according to the present invention preferably comprises the steps of:
i) withdrawing a fifth stream comprising fluidization gas and agglomerates of the polymer of the at least one olefin from the bottom zone of the polymerization reactor;
j) separating the agglomerates of the polymer of the at least one olefin from the fifth stream to obtain a sixth stream of fluidization gas depleted from agglomerates of the polymer of the at least one olefin; and
k) optionally reintroducing the sixth stream of fluidization gas into the bottom zone of the polymerization reactor together with the first stream of fluidization gas.

By means of process steps i) to k) agglomerates of polymer particles or polymer particles with a very large particle size are withdrawn from the polymerization reactor. These steps step also contribute to a narrower particle size distribution.

Preferably, the process of the present invention is a continuous process.

It has been found that the gas flow needed to obtain good conditions without excess entrainment of polymer from the bed, on one hand, and reduced adhesion of polymer on the walls, on the other hand, depends on the properties of the polymer powder. For reactors with L/D of the middle zone of 4 or greater, preferably 5 or greater it has now been found that the gas velocity should be chosen such that the dimensionless number, $N_{Br}$, is within the range of from 2.5 to 7, more preferably from 2.5 to 5. The number $N_{Br}$ can be calculated by using equation (I):

$$N_{Br} = \frac{\frac{d_{90} - d_{10}}{d_{50}}}{\frac{U_s}{U_t}} \quad (I)$$

In equation (I) $d_{90}$ denotes the smallest equivalent particle diameter such that 90% of all particles within the bed have a smaller equivalent diameter than $d_{90}$; $d_{10}$ denotes the smallest equivalent particle diameter such that 10% of all particles within the bed have a smaller equivalent diameter than $d_{10}$; $d_{50}$ represents the median equivalent particle diameter of the particles within the bed; US is the superficial gas velocity within the middle zone; and $U_t$ is the terminal velocity of the particles within the reactor. According to Geldart (Gas Fluidisation Technology, John Wiley & Sons, 1986), equation 6.16, the terminal velocity in turbulent regime can be calculated from the equation (II) below:

$$U_t = \sqrt{\frac{4}{3} \cdot \frac{(\rho_p - \rho_g) \cdot g \cdot d_v}{K_N \cdot \rho_g}} \quad (II)$$

In equation (II) $\rho_p$ denotes the particle density (which is the mass of the particle divided by its hydrodynamic volume; the volume of eventual pores is included in the hydrodynamic volume, see explanations in section 6.12 of Geldart), $\rho_g$ is the density of the fluidisation gas, g is the gravity acceleration constant (9.81 m/s$^2$), $d_v$ is the volume diameter of the particles (median volume diameter if the particles have different diameters), and $K_N$ is a correction factor. According to Geldart $K_N$ can be calculated from equation (III).

$$K_N = 5.31 - 4.88 \cdot \psi \quad (III)$$

In equation (III) ψ denotes the ratio of the surface area of the equivalent volume sphere to the surface area of the particle, or $(d_v/d_s)^2$, where $d_v$ is the (median) volume diameter and $d_s$ is the (median) surface diameter of the particle (see Section 2.2 of Geldart).

The $d_{90}$, $d_{10}$ and $d_{50}$ values in the equation are suitably and preferably volume diameters and the percentages 90%, 10% and 50% are based on the mass of the particles. However, as the ratio is dimensionless it is not absolutely mandatory for $d_{90}$, $d_{10}$ and $d_{50}$ to represent the volume diameter, but they may also represent another, such as surface per volume or surface, diameter as long as they all represent the same diameter.

It has now been found that the number $N_{Br}$ is a useful characteristic to describe the fluidisation regime in the fluidised bed reactor. At low values of $N_{Br}$ the bed is in transport conditions. When $N_{Br}$ increases the bed goes over to fluidised conditions, first to entrained fluidisation, then bubbling fluidisation and finally minimum fluidisation.

For low values of $N_{Br}$ of less than 2.5 the bed is in transport conditions. Thereby a substantial entrainment of polymer from the bed takes place depending on particles' size and size distribution. Operation in this regime increases the risk of producing fines due to particle attrition. Powder mixing will be reduced as there is mainly conveying. Cyclone separation efficiency is also reduced and the risk of blocking solids transport line increases. On the other hand, for high values of $N_{Br}$ of greater than 7 the bed is in standard bubbling conditions and then mass and heat transfer within the bed remain insufficient. The solids mixing may be ineffective, increasing the risk of fouling and agglomeration of particles. The operation of the reactor may become less stable, leading to an increased risk of reactor shut-down.

The superficial gas velocity of the fluidization gas in the middle zone of the polymerization reactor is preferably in the range of from 0.4 to 1.0 m/s, more preferably from 0.5 to 0.9 m/s and most preferably from 0.6 to 0.8 m/s. In a conventional fluidized bed reactor the superficial gas velocity for the polymerization of ethylene polymers is in the range of 0.3 to 0.6 m/s and for the polymerization of propylene polymers is in the range of 0.4 to 0.7 m/s.

Preferably, the particles of the polymer of the at least one olefin in the fluidized bed of the polymerization reactor have a particle size D90 of from 1000 µm to 2500 µm, more preferably of from 1250 µm to 2250 µm and most preferably of from 1500 µm to 2500 µm.

Further, the particles of the polymer of the at least one olefin in the fluidized bed of the polymerization reactor preferably have a particle size D50 of from 400 µm to 1500 µm, more preferably of from 500 µm to 1250 µm and most preferably of from 600 µm to 1000 µm.

Still further, the particles of the polymer of the at least one olefin in the fluidized bed of the polymerization reactor preferably have a particle size $d_{10}$ of from 100 µm to 500 µm, more preferably of from 120 µm to 350 µm and most preferably of from 150 µm to 250 µm.

Preferably, the polymer particles have a narrow span of the particle size distribution. Thereby, it is preferred that the particles of the polymer of the at least one olefin in the fluidized bed of the polymerization reactor have a span of particle size distribution (PSD), being the ratio of $(d_{90}-d_{10})/d_{50}$, of from 1.0 to 2.0, more preferably of from 1.2 to 2.0 and most preferably of from 1.4 to 1.9.

Polymerization

The monomers polymerized in the process of the present invention are typically alpha-olefins having from 2 to 12 carbon atoms, preferably from 2 to 10 carbon atoms. Preferably, the olefins are ethylene or propylene, optionally together with one or more other alpha-olefins having from 2 to 8 carbon atoms. Especially preferably, the process of the present invention is used for polymerizing ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

Thus, the polymer material is preferably selected from alpha-olefin homo- or copolymers having alpha-olefin monomer units of from 2 to 12 carbon atoms, preferably from 2 to 10 carbon atoms. Preferred are ethylene or propylene homo- or copolymers. The comonomer units of ethylene copolymers are preferably selected from one or more comonomers selected from alpha-olefins having from 4 to 8 carbon atoms. The comonomer units of propylene copolymers are preferably selected from one or more comonomers selected from ethylene and alpha-olefins having from 4 to 8 carbon atoms.

Catalyst

The polymerization is conducted in the presence of an olefin polymerization catalyst. The catalyst may be any catalyst, which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support. The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has median particle size from 6 to 90 µm, preferably from 6 to 70 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646.

Alternatively, it can be prepared by first preparing a solution from the components and then contacting the solution with a carrier, as described in WO-A-01/55230. Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235. Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR2 bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560, 671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerization Stages

The polymerization in the fluidized bed may be preceded by prior polymerization stages, such as prepolymerization or another polymerization stage conducted in slurry or gas phase. Such polymerization stages, if present, can be conducted according to the procedures well known in the art. Suitable processes including polymerization and other process stages which could precede the polymerization process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerization stages.

It is especially preferred that the process of the present invention is a multi-stage process for polymerizing at least one olefin, in which at least two polymerization stages are connected in series, wherein the process for polymerizing at least one olefin in gas phase in a fluidized bed as described above or below is one polymerization stage that is preceded by at least one polymerization stage.

In the multi-stage process the process for polymerizing at least one olefin in gas phase in a fluidized bed as described above or below is preferably the last polymerization stage.

The at least one olefin polymerized in the multistage process is preferably polymerized in the presence of a supported polymerization catalyst as defined above.

Usually, a multi-stage process is a process that makes use of at least two reactors, one for producing a lower molecular weight component and a second for producing a higher molecular weight component of the ethylene polymer. These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional olefin homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

The polymerization stages previous to the process for polymerizing at least one olefin in gas phase in a fluidized bed as described above or below can be conducted in any selection of slurry reactors, liquid phase reactors and gas phase reactors.

A two-stage process according to the present invention can, for example be a slurry-gas phase or a gas phase-gas phase process, particularly preferably a slurry-gas phase process. Thereby, the gas-phase reactor of the last stage thereby is the process for polymerizing at least one olefin in gas phase in a fluidized bed as described above or below. Optionally the multi-stage process can comprise one or two additional polymerization steps.

The slurry and gas phase stages previous to the process for process for polymerizing at least one olefin in gas phase in a fluidized bed as described above or below may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The term gas phase reactor encompasses any mechanically mixed, fluidized bed reactor, horizontal gas-solids mixing reactor or settled bed reactor or gas phase reactors having two separate zones, for instance one fluidized bed combined with one settled bed zone. Preferably the gas phase reactor for the last polymerization stage is a fluidized bed reactor.

The slurry and gas phase processes are well known and described in the prior art.

The process of the present invention may include at least one, such as one or two polymerization stages which are conducted in one or more slurry phase reactor(s), such as loop reactor(s), followed by a gas-phase reactor.

The polymerization temperature in the slurry phase reactor(s) preferably is 70 to 115° C., more preferably is 75 to 105° C., and most preferably is 80 to 100° C., and the temperature in the gas-phase reactor preferably is 70 to 105°

C., more preferably is 75 to 100° C., and most preferably is 82 to 97° C. The pressure in the slurry reactor is typically from 1 to 150 bar, preferably from 1 to 100 bar and the pressure in the gas phase reactor is typically at least 10 bar, preferably at least 15 bar but typically not more than 30 bar, preferably not more than 25 bar.

The polymerization in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerization steps.

The olefin monomer content in the fluid phase of the slurry in the slurry phase reactor may be from 0.5 to 50% by mole, preferably from 1 to 20% by mole, and in particular from 2 to 10% by mole.

The polymerization process may further comprise a pre-polymerization step which precedes the polymerization steps. The purpose of the pre-polymerization is to polymerise a small amount of polymer onto the catalyst at a low temperature and/or a low monomer concentration. By pre-polymerization it is possible to improve the performance of the catalyst in slurry and/or modify the properties of the final polymer. The pre-polymerization step may be conducted in slurry or gas phase. Preferably the pre-polymerization is conducted in slurry.

Thus, the pre-polymerization step may be conducted in a loop reactor. The pre-polymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerization step is typically from 0° C. to 90° C., preferably from 20° C. to 80° C. and more preferably from 45° C. to 75° C.

The pressure is not critical and is typically from 1 bar to 150 bar, preferably from 10 bar to 100 bar.

The catalyst components are preferably all introduced to the pre-polymerization stage. However, where the solid catalyst component and the co-catalyst can be fed separately it is possible that only a part of co-catalyst is introduced into the pre-polymerization stage and the remaining part into the subsequent polymerization stages. Also in such cases it is necessary to introduce as much co-catalyst into the pre-polymerization stage as necessary to obtain a sufficient polymerization reaction.

In the case that the polymerization process does not comprise a pre-polymerization stage the catalyst components are suitably all introduced into the polymerization reactor of the first polymerization stage.

Preferably, in the first polymerization stage of the multi-stage process, which is not a pre-polymerization stage, the catalyst activity is at least 15 kg/gcat/h, more preferably at least 18 kg/gcat/h.

It is further preferred that in each polymerization stage subsequent to said first polymerization stage the catalyst activity is not more than 80% of the catalyst activity in said first polymerization stage.

Fluidized Bed Polymerization

In the fluidized bed polymerization reactor the polymerization takes place in a gas phase, in a fluidized bed formed by the growing polymer particles in an upwards moving gas stream. In the fluidized bed the polymer particles, containing the active catalyst, come into contact with the reaction gases, such as monomer, optionally comonomer(s) and optionally hydrogen which cause polymer to be produced onto the particles.

The polymerization takes place in a reactor including a bottom zone, a middle zone and a top zone. The bottom zone forms the lower part of the reactor in which the base of the fluidized bed is formed. The base of the bed forms in the bottom zone with typically no gas distribution grid, fluidization grid, or gas distribution plate, being present. Above the bottom zone and in direct contact with it is the middle zone. The middle zone and the upper part of the bottom zone contain the fluidized bed. Because there is typically no fluidization grid there is a free exchange of gas and particles between the different regions within the bottom zone and between the bottom zone and the middle zone. Finally, above the middle zone and in direct contact therewith is the top zone.

As it is well understood by the person skilled in the art the entrainment rate of the polymer depends on the bed height and the fluidization velocity. Typically, the powder entrainment flux is from 0.1 to 70 kg/(s·m$^2$), such as from 0.3 to 40 kg/(s·m$^2$), wherein the entrainment flux is given as the flow rate of the powder entrained from the reactor with the fluidization gas (in kg/s) divided by the cross-sectional area of the pipe through which the fluidization gas is withdrawn from the top of the fluidized bed reactor. The process of the present invention is especially useful when the entrainment flux is at the upper end of the range, such as from 0.5 to 30 kg/(s·m$^2$).

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidized bed starts to form. When the gas velocity becomes still smaller the bed becomes denser and the polymer particles distribute the gas over the whole cross-section of the bed.

Preferably, the equivalent cross-sectional diameter of the bottom zone is monotonically increasing with respect to the flow direction of the fluidization gas through the fluidized bed reactor. As the flow direction of the fluidization gas is upwards with respect to the base, the equivalent cross-sectional diameter of the bottom zone is vertically monotonically increasing.

The bottom zone preferentially has straight circular cone shape. More preferably, the cone-angle of the cone-shaped bottom zone is 5° to 30°, even more preferably 7° to 25° and most preferably 9° to 18°, whereby the cone-angle is the angle between the axis of the cone and the lateral surface. It is not necessary in this preferred embodiment, however, that the bottom zone has the shape of a perfect cone but it may also have a shape of a truncated cone.

The bottom zone may also be seen as being constructed of a plurality of conical sections having different cone-angles. In such a case it is preferred that at least the conical section where the base of the fluidized bed is formed has the cone-angle within the above-specified limits. In a most preferred embodiment all the conical sections forming the bottom zone have the cone-angles within the above-specified limits. If the bottom zone comprises multiple conical sections it is then preferred that the steeper sections with a narrower cone angle are located at the lower end of the bottom zone and the sections with a wider cone angle are located at the higher end of the bottom zone. Such arrangement is believed to increase the shear forces at the wall of the reactor thus helping to prevent the polymer from adhering to the walls.

It is further preferred that the equivalent diameter of the bottom zone increases from about 0.1 to about 1 metres per one metre of height of the bottom zone (m/m). More preferably, the diameter increases from 0.15 to 0.8 m/m and in particular from 0.2 to 0.6 m/m.

The preferred cone-angles lead to additional improved fluidization behavior and avoid the formation of stagnant zones. As a result, the polymer quality and stability of the process are improved. Especially, a too wide cone-angle leads to an uneven fluidization and poor distribution of the gas within the bed. While an extremely narrow angle has no detrimental effect on the fluidization behavior it anyway leads to a higher bottom zone than necessary and is thus not economically feasible.

It is possible that there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

The fluidized bed reactor of the present invention typically comprises no gas distribution grid or plate. The even distribution of the fluidization gas within the bed is achieved by the shape of the bottom zone. The omission of the gas distribution grid reduces the number of locations where fouling and chunk formation can start. The terms gas distribution grid or gas distribution plate or fluidization grid are used synonymously to denote a metal plate or a construction within the reactor which has a purpose of distributing the fluidization gas evenly throughout the cross-sectional area of the reactor. In the reactors where a gas distribution grid is used it generally forms the base of the fluidized bed.

The middle zone of the fluidized bed reactor has a generally cylindrical shape. Preferably it will be in the form of a straight circular cylinder being denoted herein simply cylinder. From a more functional perspective, the middle zone will essentially form a domain wherein the superficial velocity of the fluidization gas is essentially constant.

The middle zone typically contains most of the fluidized bed. While the bed extends also to the bottom and top zones, its major part is within the middle zone.

The middle zone usually has a ratio of the height over diameter (L/D) of at least about 4, preferably at least about 5. The height over diameter is typically not more than 15, preferably not more than 10.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor. Suitably the superficial velocity of the fluidization gas is within the range of from 0.45 to 1.0 m/s. The process of the present invention is especially useful when the superficial velocity of the fluidization gas is within the range of from 0.45 to 0.9 m/s, preferably from 0.50 to 0.90 m/s, especially preferably from 0.55 to 0.90 m/s and in particular from 0.60 to 0.90 m/s.

The height L of the middle zone is the distance of the lowest point of the generally cylindrical part of the reactor to the highest point of the generally cylindrical part of the reactor. The lowest point of the generally cylindrical part is the lowest point above which the diameter of the reactor no longer increases with the height of the reactor but remains constant. The highest point of the generally cylindrical part is the lowest point above which the diameter of the reactor no longer remains constant with the height of the reactor but decreases. The diameter D of the middle zone is the (equivalent) diameter of the reactor within the generally cylindrical part.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat transfer. Further the high velocity of the gas and particles vicinal to the inner walls minimizes lump- and sheet formation. The top zone has a generally conical, upwards tapering shape. It is further preferred that the ratio of the height of the top zone to the diameter of the middle zone is within the range of from 0.3 to 1.5, more preferably 0.5 to 1.2 and most preferably 0.7 to 1.1.

It is particularly preferred that the cone forming the top zone is a straight circular cone and the cylinder forming the middle zone preferably is a circular cylinder. More preferably the cone-angle of the cone-shaped top zone is 10° to 50°, most preferably 15 to 45°. As defined above, the cone-angle is the angle between the axis of the cone and the lateral area.

The specific cone-angles of the cone-shaped upper zone further improve the tendency for back-flow of the particles counter current to the fluidization gas. The resulting unique pressure balance leads to an intensive break up of bubbles, whereby the space-time-yield and solids concentration are further increased. Further as mentioned above, the wall flow velocity, i.e., the velocity of particles and gas vicinal to the inner walls is high enough to avoid the formation of lumps and sheets.

Separation of Fines

The upwards moving gas stream is established by withdrawing a fluidization gas stream from the top zone of the reactor, typically at the highest location. The gas stream withdrawn from the reactor is then directed to a suitable separation unit for removing fines. Examples of such units include for example at least one cyclone.

A cyclone in its simplest form is a container in which a rotating flow is established. Cyclone design is well described in the literature. Particularly suitable cyclones are described in documents Kirk-Othmer, Encyclopaedia of Chemical Technology, $2^{nd}$ edition (1966), Volume 10, pages 340-342

Cyclonic separation is a method of removing particulates from gas without the use of filters, through vortex separation. When removing particulate matter from gas, gas cyclones are used. The gas cyclone geometry, together with the flow rate define a cut point of the cyclone which is the mean particle size of the fine particles that will be removed from the stream with at least 50% efficiency so that particles larger than the cut point will be removed with a greater efficiency and smaller particles with a lower efficiency.

The present invention typically comprises a separation unit which comprises at least one cyclone connected in series with the fluidized bed polymerization reactor. Preferably, the separation unit comprises at least two cyclones connected in series.

In one preferred embodiment fines removal/separation in the process of the present invention takes place in at least two-stage cyclonic separation series using conventional (known in the art) gas cyclones (devices for separating solids from gas). The two cyclones are identical in terms of operation and geometrical features (length to diameter ratio, etc.) but different in size. Typically the first cyclones has a bigger size as the second cyclone. Typically the ratio of the internal pipe diameter of the first cyclone to the internal pipe diameter of the second cyclone is in the range of 2 to 5, more typically from 3 to 4. Typically the ratio of the diameter of the cylindrical part of the first cyclone to the diameter of the cylindrical part of the second cyclone is in the range of 3 to 6, more typically from 4 to 5. Typically the ratio of the overall height of the first cyclone to the overall height of the second cyclone is in the range of 2 to 5, more typically from 3 to 4.

In general, the larger-size particles are collected in the bottom stream of the first cyclone (dense phase) and the small size particles (fines) are present in the lean phase of the first cyclone which are directed to the second cyclone in order to simply collect them. Subsequently, the fines either will be returned back to the reactor or they will be completely removed from the process (depending on the product quality and reactor operability).

Fines means in this connection small-size polymer particles (i.e., for polyethylene size<150 microns, for polypropylene size<220 microns) which have the tendency to carry over and typically cause operability challenges in gas phase reactors (i.e., bed segregation, poor fluidization quality, electrostatic charges) and also product quality issues (i.e., product inhomogeneity, white spots, etc.). Larger-size particles means for polyethylene size equal to or >150 microns, for polypropylene size equal to or >220 microns.

The flow rate of the gas-solid stream usually diminishes from first cyclone to the second cyclone. Typically the flow rate to the first cyclone is between 1 to 120 t/h. The flow rate to the second cyclone is typically between (0.01-0.07)×(1-120 t/h), in other words 0.01×flow rate to the first cyclone–0.07×flow rate to the first cyclone.

More precisely, the second stream comprising fluidization gas and olefin polymer particles is directed to a first cyclone thereby removing the olefin polymer particles from the second stream to obtain a stream comprising fluidization gas and a reduced amount of olefin polymer particles and a fourth stream of separated olefin polymer particles. The stream comprising fluidization gas and a reduced amount of olefin polymer particles is further directed to a second cyclone thereby removing fines (very small size particles) from the stream of fluidization gas obtained from the preceding cyclone and still containing polymer particles to obtain a third stream of fluidization gas depleted from particles of the olefin polymer.

Said third stream of fluidization gas can be reintroduced into the bottom zone of the polymerization reactor as first stream of fluidization gas (i.e. as circulation gas). Preferably, the circulation gas is filtered before being passed to a compressor in which the circulation gas is compressed. Additional monomer, optionally comonomer(s), optionally hydrogen and inert gas are suitably introduced into the circulation gas line. It is preferred to analyze the composition of the circulation gas, for instance, by using on-line gas chromatography and adjust the addition of the gas components so that their contents are maintained at desired levels.

The fourth stream enriched with particles of the olefin polymer separated from the first cyclone can be reintroduced into the polymerization reactor or be completely removed from the process (depending on the product quality and reactor operability).

The process stream enriched with the fines withdrawn from the second cyclone can be reintroduced into the polymerization reactor or be completely removed from the process (depending on the product quality and reactor operability).

Typically the separation unit of the process of the present invention comprises at least one cyclone, preferably two cyclones connected in series with the fluidized bed polymerization reactor. However, also a higher number of cyclones may be used, such as 3, 4, 5 or 6 cyclones connected in series.

Agglomerates Removal

Typically in the stream comprising fluidization gas and agglomerates of olefin polymer, the $d_{50}$ of particles, i.e. agglomerates and/or catalyst particles is typically above 25 mm.

According to an embodiment of the invention the agglomerates of olefin polymer that can be formed during the dynamic operation are separated from the fluidization gas and withdrawn from the bottom zone of the reactor, typically by using an agglomerate trap.

Withdrawal of Agglomerates

The agglomerates eventually present in the reactor may be withdrawn by using an agglomerate trap below the bottom zone and suitably below the base of the fluidized bed. After recovering the agglomerates may be disposed of or they may be crushed and mixed with the product.

When the agglomerates reach a certain size they no longer remain fluidized by the fluidization gas but start falling downwards in the bed. When they are big enough they fall through the bottom zone to the agglomerate trap. The critical size depends on the fluidization velocity, on one hand, and the density of the fluidized bed, on the other hand. Especially the density of the bed has a strong effect on the residence time of the agglomerates in the bed before they drop out of the bed. In the normal operation conditions as described above, for instance a bed density between 180 and 320 kg/m$^3$ and the fluidization velocity in the middle zone between 0.60 and 0.95 m/s, the residence time of the agglomerates in the bed is typically not more than 300 seconds and preferably not more than 180 seconds. Usually the agglomerate does not drop instantaneously through the bed but remains there at about 5 seconds, minimum.

The agglomerate trap typically comprises a cylinder which is isolated from the bottom zone and the downstream equipment, for instance, by two valves. The valves are operated in sequence to allow filling and emptying of the cylinder.

The content of agglomerates in the trap, or a process variable which indicates the content of the agglomerates, is measured. Such measurement may include the measurement of the density of the contents of the agglomerate trap, for instance by radioactive measurement.

Another option is to measure the temperature in the agglomerate trap. The polymer and polymer agglomerates still contain active catalyst and therefore they are heated by the heat of the polymerization. The inventors have found that the temperature in the agglomerate trap may increase substantially when the trap contains agglomerates, for instance by at least 2.5° C., or by at least 3° C., such as from 4° C. to 30° C. or even more, or from 5° C. to 20° C., or even more. The advantage of the temperature measurement is that the measurement is not hazardous, it is cheap and easy to implement and the accuracy is good.

Instead of measuring the temperature in the agglomerate trap it is also possible to measure a temperature difference, for instance, between the temperature in the agglomerate trap and the bottom zone of the reactor, or the difference in the temperatures in the agglomerate trap during two different process steps.

The opening and closing of the isolation devices, such as valves, is suitably controlled by a sequence controller. According to one suitable mode of operation the connection to the bottom zone of the reactor is kept open. At a suitable point of time the connection is closed and discharging of the agglomerate trap to the downstream process is activated. When the discharge is completed then the connection to the bottom zone of the reactor is reopened.

According to one preferred embodiment the opening and closing of the valves may be controlled so that when the measurement indicates the presence of agglomerates in the agglomerate trap then the connection to the bottom zone is closed and the discharge is activated. When the discharge is completed the connection to the bottom zone is reopened.

According to another preferred embodiment the sequence controller, such as a programmable logic controller, keeps the connection to the bottom zone open for a predetermined period. After the lapse of the period the connection to the bottom zone is closed and the discharge activated. When the discharge is completed the connection to the bottom zone is reopened.

It is important that during the operation of the process the connection between the agglomerate trap and the bottom zone of the reactor, on one hand, and the discharge of the agglomerate trap, on the other hand, are not open simultaneously. If they were, they would allow the discharge of a large amount of gas from the reactor, resulting in unstable process.

It is possible to introduce pressurized gas via a separate line to the agglomerate trap for flushing the trap. The pressurized gas can be inert gas, such as nitrogen, or it may be the circulation gas from the circulation gas line which returns the fluidization gas from the top of the reactor to the bottom thereof.

As the person skilled in the art understands, the agglomerate trap, including the connection lines and the valves, must be designed to allow the flow of the agglomerates from the bottom zone to the trap. Also it must be possible to discharge the agglomerates from the agglomerate trap. Typically the agglomerates have a size of from 25 to 100 mm, or even greater. The design should thus allow the removal of at least 25 mm objects. Suitably the minimum diameter of the pipes and equipment in the agglomerate trap is at least 50 mm, preferably at least 100 mm and more preferably at least 150 mm.

Product Withdrawal

The polymer product stream is typically withdrawn from the reactor. It is preferred to withdraw polymer from the middle zone of the reactor.

The polymer preferably is withdrawn from the middle zone in any manner known in the art, either intermittently or continuously. It is preferred to withdraw the polymer continuously because then the conditions in the reactor fluctuate less than with intermittent withdrawal. Both methods are well known in the art. Continuous withdrawal is disclosed, among others, in WO-A-00/29452, EP-A-2330135 and EP-A-2594433. Intermittent withdrawal is disclosed, among others, in U.S. Pat. No. 4,621,952, EP-A-188125, EP-A-250169 and EP-A-579426.

In a preferred continuous withdrawal method the polymer is withdrawn through an open pipe. In one preferred embodiment the pipe is equipped with a control valve which position is automatically adjusted to maintain a desired outflow rate. The valve position may be set, for instance, by the reactor bed level controller. In another preferred embodiment the pipe discharges the polymer to a vessel, the pressure of which is controlled to maintain a desired pressure difference between the reactor and the vessel. The pressure difference then sets the polymer flow rate from the reactor to the vessel.

According to an embodiment of the invention the olefin polymer product stream having a narrow particle size distribution is further subjected to downstream processes, such as removal of hydrocarbons in the post-reactor treatment stage, mixing with additives and extrusion.

Post-Reactor Treatment

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Use

The present invention further relates to the use of the process according to the invention as defined above or below for polymerizing an olefin homo- or copolymer having a narrow particle size distribution.

Preferably, the olefin homo- or copolymer has a span of particle size distribution (PSD), being the ratio of $(d_{90}-d_{10})/d_{50}$, of from 1.0 to 2.0, more preferably of from 1.2 to 2.0 and most preferably of from 1.4 to 1.9.

However, the process of the present invention is not only restricted to the polymerization of an olefin homo- or copolymer having a narrow particles size distribution.

When adapting the process conditions, the process of the present invention is also suitable for the polymerization of olefin homo- or copolymer having a broader particle size distribution as discussed above.

Thus, the present invention also generally relates to the use of the process according to the invention as defined above or below for polymerizing an olefin homo- or copolymer.

It is preferred that the process according to the present invention as defined above or below is the last polymerization stage of a sequential multistage polymerization process.

Still further, the present invention relates to the use of a multi-stage polymerization process in which at least two polymerization stages are connected in series and the last polymerization stage is said process for polymerizing at least one olefin in gas phase in a fluidized bed as defined above or below for obtaining a higher polymer production split in said last polymerization stage.

DESCRIPTION OF THE DRAWINGS

FIG. 1 is an example embodiment of the method and arrangement of the present invention, for producing polymer particles with enhanced thermal homogeneity, wherein the invention comprises a reactor system comprising a reactor (2), which has a bottom zone (8), a middle zone (6) and a top zone (4). The fluidisation gas is introduced into the bottom zone (8) through a line (5) obtained from cyclone (18). While the gas flows upwards through the bottom zone (8) its superficial velocity reduces due to the increasing diameter. A fluidized bed starts to form within the bottom zone (8). The gas continues to travel upwards through the middle zone (6) where the gas velocity is constant and the bed is fully formed. Finally, the gas reaches the top zone (4) from where together with entrained solids, passes along line as a stream (12) to at least one cyclone (18). Other cyclones are not shown in FIG. 1. The cyclone(s) (18) removes all the entrained solids from the circulation gas which is recovered and it passed through the gas outlet line (14) and directed optionally to a compressor (20) and then optionally to a cooler (22) and form the cooler the gas is introduced to the fluidized bed reactor (2) via the gas inlet (5). The stream(s) of separated olefin polymer particles are passed from the cyclone(s) (18) to line (16) via a rotary feeder (not shown in FIG. 1) or any other powder feed arrangements to control the solids flow rate (not shown in FIG. 1). Downstream of the rotary feeders (not shown in FIG. 1) there is a three-way valve (36) which directs the powder stream either via line (38) to downstream process stages or return the powder stream into the reactor (2) along the line (26).

Figure 1:
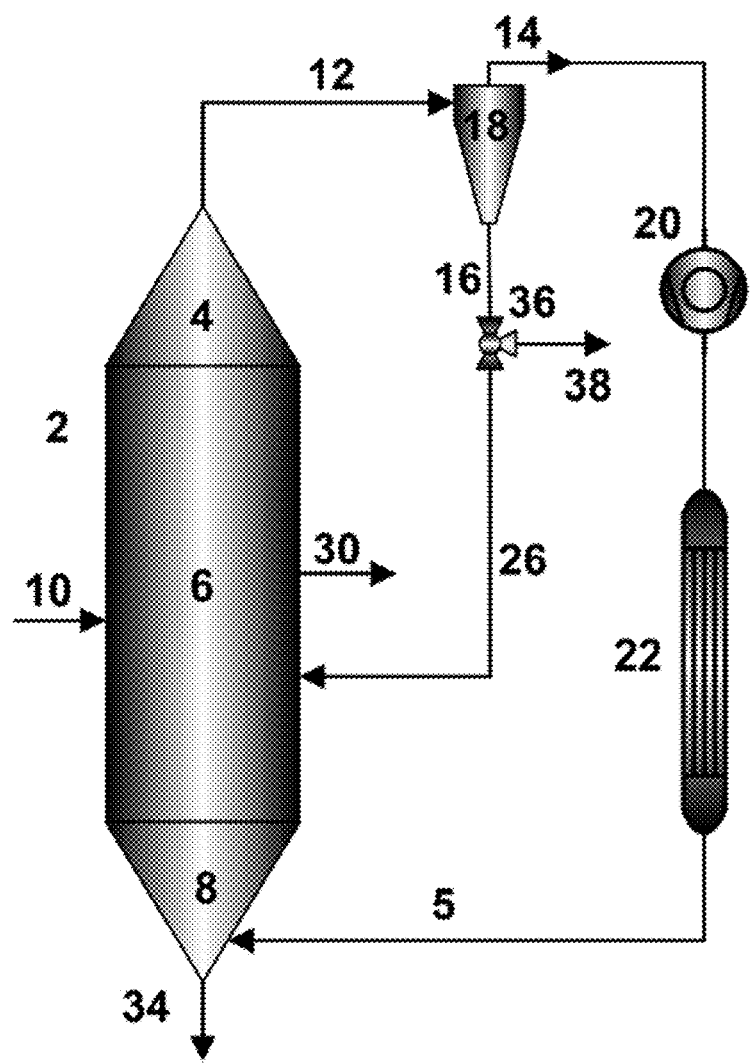
FIG. 1: Reference Numbers
2 fluidized bed polymerization reactor (Double Cone Reactor)
4 top zone
6 middle zone
8 bottom zone
10 catalyst feed and optionally polymer feed from previous steps
12 stream comprising fluidization gas and particles of olefin polymer
14 stream comprising fluidization gas and reduced amount of olefin polymer particles
16 line of recycling separated olefin polymer particles
18 cyclone (means for gas-solids separation)
20 means for pressurising
22 means for cooling
26 line of returning the powder into the reactor
30 a first line for withdrawing olefin polymer product stream
34 agglomerates removal outlet
36 a three-way valve
38 a second line for withdrawing olefin polymer product stream

The polymer product is withdrawn from the reactor (2) along one or more outlets (30) as second line for withdrawing olefin polymer product stream. Catalyst, optionally dispersed within polymer particles from a preceding polymerization stage, is introduced into the reactor (2) along line (10). Agglomerates are removed though outlet (34). The method and arrangement shown in FIG. 1 is preferably part of a multistage polymerization process for polymerizing olefins in which two or more polymerization stages are arranged in series. It is especially preferred that the method and arrangement shown in FIG. 1 reflects the last polymerization stage in said multistage polymerization process.

Figure 2:
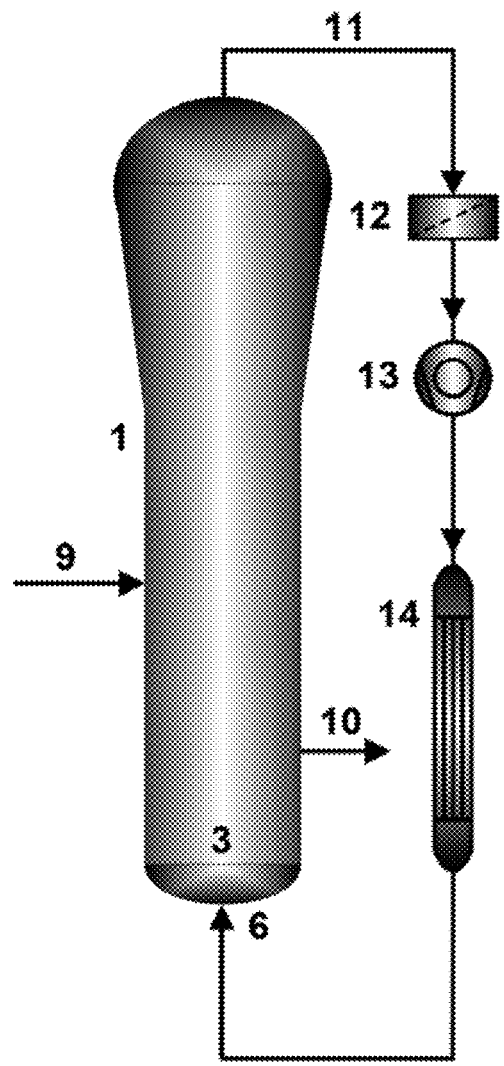

FIG. 2: Reference Numbers
1 fluidized bed reactor
3 distribution plate
6 inlet for circulation gas
9 inlet for polymer, catalyst or catalyst containing pre-polymer
10 outlet for polymer
11 outlet for gas and/or polymerized particles
12 solids filter
13 means for pressurizing
14 means for cooling The reactor assembly (FIG. 2) includes a conventional fluidized bed reactor (1) in which gas(es) enters via the distribution plate (3). The catalyst or catalyst containing prepolymer from an earlier reaction stage enter the fluidized bed reactor (1) through a separate inlet (9) at the side wall at the height of the reaction zone of the fluidized bed reactor. The fluidized bed reactor (1) is of cylindrical shape. Momoner, optionally comonomer, certain catalyst components and/or chain growth controller or chain transfer agent and/or fluidization gas enter the fluidized bed reactor (1) through inlet (6) at the lower part of the fluidized bed reactor (1) thereby forming the reaction gas. These streams can also be introduced to the fluidized bed reactor (1) through separate inlets (6) at the lower end of the fluidized bed reactor (1) (not shown in FIG. 2).

In the fluidized bed reactor (1) a fluidized bed of catalytic particles is generated and maintained in the reaction zone on which particles further polymer is formed due to the polymerization reaction. At the top of the fluidized bed reactor (1) the polymer particles are separated from the gas in a disengaging zone. The gas(es) leaves the fluidized bed reactor (1) through gas outlet (11) at the upper end of the fluidized bed reactor (1). The gas(es) can be separated from optional polymer particles in solids filter (12), repressurized (13), cooled (14), optionally recycled and then recirculated to gas inlet (6) of the fluidized bed reactor (1).

EXAMPLES

Example 1 (Comparative)

Catalyst particles exhibiting a size distribution of $d_{10}$ equal to 15 μm, $d_{50}$ equal to 25 μm, and $d_{90}$ equal to 40 m, (i.e., typical ZNPE catalyst, span=1.0) were polymerized in a continuous ethylene pre-polymerization reactor at Borstar conditions for a mean residence of 30 mins and average catalyst activity 2 kg/$g_{cat}$/h (i.e., $t_{pre}$=30 mins, $R_p$=2 kg/$g_{cat}$/h). Subsequently, the polymer material was transferred to the loop reactor where it was polymerized under Borstar conditions for a mean residence of 60 mins with average catalyst activity 18 kg/$g_{cat}$/h (i.e., $t_{loop}$=60 mins, $R_p$=18 kg/$g_{cat}$/h). After the loop reactor the residual hydrocarbons were flushed out and the polymer particles were transferred to a conventional bubbling fluidized gas phase reactor (FBR) where 5% mol 1-butene was also added (co-polymerization conditions). In FBR the polymer particles were polymerized for a mean residence equal to 2 hours with average catalyst activity of 12 kg/$g_{cat}$/h (i.e., $t_{GPR}$=120 mins, $R_p$=12 kg/$g_{cat}$/h) under temperature of 85° C. (operating temperature set point, $T_S$), pressure 20 bar and superficial gas velocity of 0.4 m/s. The $d_{10}$, $d_{50}$ and $d_{90}$ of the polymer particles produced in the gas phase reactor were estimated based on a simulation tool taking into account the residence time distribution in all the reactors of the series. (i.e., see Table 1). It can be observed that a specific PSD is produced (i.e., span=1.9) which is provided in Table 1.

TABLE 1

Catalyst and polymer PSD in conventional FBR.

| PSD Characteristics | Catalyst (μm) | Polymer Particle in FBR (μm) |
|---|---|---|
| $d_{10}$ | 15 | 180 |
| $d_{50}$ | 25 | 880 |
| $D_{90}$ | 40 | 1850 |
| Span | 1.0 | 1.9 |

Table 2 shows the temperature distribution of polymer particles with different sizes in the conventional fluidized bed reactor (FBR).

The temperature distribution of the polymer particles is calculated via the so-called particle overheating (ΔTov) according to the formula $$\Delta Tov = T_{PP} - T_S,$$

wherein $$\Delta Tov = Q_g/(hA_{PP}),$$

with $Q_g$ being the heat that is produced due to polymerization (it is calculated based on the polymerization kinetics, or reactor productivity), h being the external heat transfer coefficient and $A_{PP}$ is the external surface of the polymer particles.

$$h = (k_g Nu)/D_{PP},$$

wherein kg is the thermal conductivity of the gaseous mixture (transport property), $D_{PP}$ is the diameter of the polymer particles and Nu is a dimensionless number that is defined as the ratio of convective to conductive heat transfer across external boundary layer of the polymer particles and it very much depends on the superficial gas velocity (operating condition).

In the above calculation all temperatures are given in ° C.

The temperature distribution of the polymer particles is calculated by following a well-established procedure that is described in the following scientific articles:

Gas-Phase Olefin Polymerization in the Presence of Supported and Self-Supported Ziegler-Natta Catalysts, V. Kanellopoulos, B. Gustafsson and C. Kiparissides, (2008), Macromolecular Reaction Engineering 2(3), pp.: 240-252.

Comprehensive Analysis of Single-Particle Growth in Heterogeneous Olefin Polymerization: The Random-Pore Polymeric Flow Model, V. Kanellopoulos, G. Dompazis, B. Gustafsson and C. Kiparissides, (2004), Industrial & Engineering Chemistry Research 43(17), pp.: 5166-5180.

TABLE 2

Polymer particles temperature distribution in conventional FBR.

| Particle Size (μm) | Particle Temperature (C.) |
|---|---|
| 231 | 85.5 |
| 463 | 86.8 |
| 695 | 88.7 |
| 926 | 91.3 |
| 1158 | 94.4 |
| 1390 | 98.0 |
| 1621 | 102.2 |
| 1850 | 106.8 |

Severe operability challenges during the operation of the FBR were experienced and significant particles agglomeration was observed. The FBR exhibited unstable operation and poor performance.

Example 2 (Inventive)

The first example was repeated with the only difference that after the flashing step, the polymer particles were fed to the double-cone fluidized bed reactor (DCR). The polymer particles in the DCR which operates at the same conditions as the conventional FBR of example 1 but with increased superficial gas velocity (i.e., 0.7 m/s) exhibit the same PSD as in the FBR, as depicted in Table 1. However, the polymer particles exhibit a narrow solids temperature distribution compared to the polymer particles in the conventional FBR (see Table 3).

TABLE 3

Polymer particles temperature distribution in DCR.

| Particle Size (μm) | Particle Temperature (C.) |
|---|---|
| 231 | 85.3 |
| 463 | 85.9 |
| 695 | 86.9 |
| 926 | 88.2 |
| 1158 | 89.8 |
| 1390 | 91.6 |
| 1621 | 93.6 |
| 1850 | 95.9 |

No operability challenges during the operation of the DCR and no particles agglomeration were observed in the collected particulate material. The reactor exhibited very stable operation and excellence performance.

Example 3 (Inventive)

The catalyst system that was used in Examples 1 and 2 has been employed to produce polymer PE particles having 923 kg/m³ density and $MFR_5$ equal to 0.24 g/10 min in a series of polymerization reactors consisting of a prepoly, a loop and a gas phase reactor. In this comparative example, the gas phase reactor is a double cone fluidized bed reactor having the following design characteristics:

Height of the bottom zone: 0.9 m
Height of the middle zone: 2.7 m
Height of the upper zone: 0.415 m
Internal diameter of the middle zone: 0.54 m The ZNPE catalyst particles were polymerized in a continuous ethylene pre-polymerization reactor at Borstar conditions exhibiting a mean residence equal to 30 mins and average catalyst activity equal to 2 kg/$g_{cat}$/h (i.e., $t_{pre}$=30 mins, $R_p$=2 kg/$g_{cat}$/h). Subsequently, the polymer material was transferred to the loop reactor where it was polymerized under Borstar conditions for a mean residence equal to 60 mins and average catalyst activity 18 kg/$g_{cat}$/h (i.e., $t_{loop}$=60 mins, $R_p$=18 kg/$g_{cat}$/h). After the loop reactor the residual hydrocarbons were flushed out using a high pressure flash tank and the polymer particles were transferred to the double cone reactor (DCR) where 5% mol 1-butene was also added (co-polymerization conditions). In DCR the polymer particles were polymerized for a mean residence equal to 2 hours exhibiting an average catalyst activity equal to 12 kg/$g_{cat}$/h (i.e., $t_{DCR}$=120 mins, $R_p$=12 kg/$g_{cat}$/h) under temperature of 85° C. (operating temperature set point, $T_S$) and pressure of 20 barg. The DCR as described above was operated so that flow rate of the fluidization gas that is introduced from the bottom of the reactor was equal to 580 m³/h. The reactor bed was filled with polyethylene with a filling degree of about 60% of the volume of the middle zone. The superficial gas velocity at the gas inlet, where the diameter of the reactor was 100 mm, was 20.5 m/s and in the middle zone 0.7 m/s. It could be seen that large size bubbles were formed; these bubbles have comparable size to reactor diameter and they travelled along the whole reactor length. In order to control reactor temperature at 85° C., the condensate content of the fluidization gas at reactor inlet was kept around 1.5% by weight.

The polymer particles in the DCR which exhibit the same PSD as in the FBR (see Table 1 of example 1). However, the polymer particles exhibit a narrow solids temperature distribution compared to the polymer particles in the conventional FBR (see Table 4).

TABLE 4

Polymer particles temperature distribution in DCR.

| Particle Size (μm) | Particle Temperature (C.) |
|---|---|
| 231 | 85.1 |
| 463 | 85.5 |
| 695 | 86.2 |
| 926 | 87.5 |
| 1158 | 88.4 |
| 1390 | 90.2 |
| 1621 | 92.5 |
| 1850 | 94.6 |

No operability challenges during the operation of the DCR and no particles agglomeration were observed in the collected particulate material. The reactor exhibited very stable operation and excellence performance.

Example 4 (Comparative)

The catalyst system that was used in all of Examples 1-3 has been employed to produce polymer PE particles having 923 kg/m³ density and MFR₅ equal to 0.24 g/10 min in a series of polymerization reactors consisting of a prepoly, a loop and a gas phase reactor. In this comparative example, the gas phase reactor is a double cone fluidized bed reactor having the design characteristics described in inventive Example 3.

The ZNPE catalyst particles were polymerized in a continuous ethylene pre-polymerization reactor at Borstar conditions exhibiting a mean residence equal to 30 mins and average catalyst activity equal to 2 kg/$g_{cat}$/h (i.e., $t_{pre}$=30 mins, $R_p$=2 kg/$g_{cat}$/h). Subsequently, the polymer material was transferred to the loop reactor where it was polymerized under Borstar conditions for a mean residence equal to 60 mins and average catalyst activity 18 kg/$g_{cat}$/h (i.e., $t_{loop}$=60 mins, $R_p$=18 kg/$g_{cat}$/h). After the loop reactor the residual hydrocarbons were flushed out using a high pressure flash tank and the polymer particles were transferred to the double cone reactor (DCR) where 7% mol 1-butene was also added (co-polymerization conditions). In DCR the polymer particles were polymerized for a mean residence equal to 2.25 hours exhibiting an average catalyst activity equal to 12 kg/$g_{cat}$/h (i.e., $t_{DCR}$=135 mins, $R_p$=12 kg/$g_{cat}$/h) under temperature of 85° C. (operating temperature set point, $T_S$) and pressure of 20 barg. The DCR as described above was operated so that flow rate of the fluidization gas that is introduced from the bottom of the reactor was equal to 330 m³/h. The reactor bed was filled with polyethylene with a filling degree of about 60% of the volume of the middle zone. The superficial gas velocity at the middle zone 0.4 m/s. It could be seen that relatively large size bubbles were formed and they travelled along the whole reactor length. The condensate content of the fluidization gas at reactor inlet was kept around 3.5% by weight.

The polymer particles in the DCR which exhibit almost the same PSD as the one in DCR of example 3 (see Table 4 of example 3). However, the polymer particles exhibit significant particle overheating (heat transfer resistances) compared with Example 3 (see Table 5).

TABLE 5

Polymer particles temperature distribution in DCR.

| Particle Size (μm) | Particle Temperature (C.) |
|---|---|
| 225 | 86.6 |
| 453 | 88.8 |
| 682 | 90.2 |
| 912 | 92.7 |
| 1125 | 95.4 |
| 1372 | 98.7 |
| 1598 | 102.8 |
| 1803 | 107.3 |

Significant operability challenges during the operation of the DCR have been experienced and severe particles agglomeration phenomena was observed in the collected particulate material (many PE lumps collected at the bottom of the reactor having mean particle size larger than 7.5 cm). The reactor exhibited unstable operation and poor performance.

The invention claimed is:
1. A process for polymerizing at least one olefin in gas phase in a fluidized bed in a polymerization reactor having a top zone of a generally conical shape as such that the equivalent cross-sectional diameter is monotonically decreasing with respect to the flow direction of the fluidization gas, a middle zone in direct contact with and below said top zone of a generally cylindrical shape and a bottom zone in direct contact and below said middle zone of a generally conical shape as such that the equivalent cross- sectional diameter is monotonically increasing with respect to the flow direction of the fluidization gas, comprising the steps of:
   a) introducing a first stream of fluidization gas into the bottom zone;
   b) polymerizing at least one olefin in the presence of a polymerization catalyst in the fluidized bed formed by particles of a polymer of the at least one olefin suspended in an upwards flowing stream of the fluidization gas in the middle zone;
   c) withdrawing a second stream comprising the fluidization gas and optionally particles of a polymer of the at least one olefin from the top zone;
   characterized in that
   the temperature of the particles of the polymer of the at least one olefin in the fluidized bed ($T_{PP}$) does not exceed 120% of the operating temperature set point ($T_S$) of the polymerization reactor, wherein $T_{PP}$ and $T_S$ are both given in ° C., wherein the superficial gas velocity of the fluidization gas in the middle zone of the polymerization reactor is in the range of from 0.45 to 1.0 m/s, the polymerization in the fluidized bed is preceded by prior polymerization stages and the particles of the polymer of the at least one olefin in the fluidized bed of the polymerization reactor have a particle size $d_{90}$ of from 1000 μm to 2500 μm and a particle size $d_{50}$ of from 400 μm to 1500 μm.

2. The process according to claim 1, further comprising the steps of:
   d) directing the second stream comprising the fluidization gas and optionally particles of the polymer of the at least one olefin into a separating unit comprising at least one cyclone;
   e) withdrawing from the separating unit a third stream of fluidization gas depleted from particles of the polymer of the at least one olefin;
   f) reintroducing said third stream of fluidization gas into the bottom zone of the polymerization reactor as first stream of fluidization gas; and
   g) withdrawing from the separating unit a fourth stream enriched with particles of the polymer of the at least one olefin.

3. The process according to claim 2, further comprising the step of:
   h) reintroducing the fourth stream enriched with particles of the polymer of the at least one olefin into the middle zone of the polymerization reactor.

4. The process according to claim 1, wherein the particles of the polymer of the at least one olefin in the second stream have a particle size $d_{50}$ of less than 150 μm.

5. The process according to claim 1, further comprising the steps of:
   i) withdrawing a fifth stream comprising fluidization gas and agglomerates of the polymer of the at least one olefin from the bottom zone of the polymerization reactor;
   j) separating the agglomerates of the polymer of the at least one olefin from the fifth stream to obtain a sixth stream of fluidization gas depleted from agglomerates of the polymer of the at least one olefin; and
   k) optionally reintroducing the sixth stream of fluidization gas into the bottom zone of the polymerization reactor together with the first stream of fluidization gas.

6. The process according to claim 1, wherein the superficial gas velocity of the fluidization gas in the middle zone of the polymerization reactor as determined as dimensionless number $N_{Br}$ is in the range of from 2.5 to 7.

7. The process according to claim 1, wherein the particles of the polymer of the at least one olefin in the fluidized bed of the polymerization reactor have a particle size $d_{10}$ of from 100 μm to 500 μm.

8. The process according to claim 1, wherein the particles of the polymer of the at least one olefin in the fluidized bed of the polymerization reactor have a span of particle size distribution (PSD), being the ratio of $(d_{90}-d_{10})/d_{50}$, of from 1.0 to 2.0.

9. The process according to claim 1, wherein the at least one olefin is selected from at least one of ethylene and alpha-olefins having from 3 to 12 carbon atoms.

10. The process according to claim 1, wherein the polymerization reactor does not comprise a fluidization grid.

11. The process according to claim 1, wherein the process is a in a multi-stage polymerization process in which at least two polymerization stages are connected in series and the last polymerization stage is said process for polymerizing at least one olefin in gas phase in a fluidized bed as defined in claim 1.

12. The process according to claim 11, wherein in the first polymerization stage of the multistage process, which is not a pre-polymerization stage, the catalyst activity is at least 15 kg/gcat/h.

13. The process according to claim 1 for polymerizing an olefin homo- or copolymer having a narrow particle size distribution.

14. The process according to claim 13, wherein the olefin homo- or copolymer has a span of particle size distribution (PSD), being the ratio of (D90–D10)/D50, of from 1.0 to 2.0.

* * * * *